Nov. 4, 1969  W. R. DAVIE  3,476,577
ANTIFOULANT COMPOSITION AND METHOD
Filed March 22, 1967
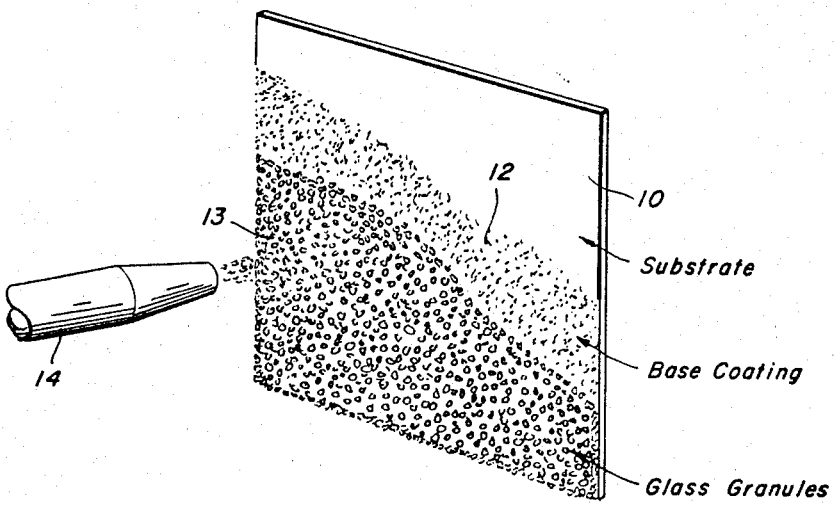
INVENTOR
WILLIAM R. DAVIE
By Donald G. Dalton
Attorney

United States Patent Office 3,476,577
Patented Nov. 4, 1969

3,476,577
ANTIFOULANT COMPOSITION AND METHOD
William R. Davie, Hopewell Township, Beaver County, Pa., assignor to United States Steel Corporation, a corporation of Delaware
Filed Mar. 22, 1967, Ser. No. 625,261
Int. Cl. C09d 5/16; B44d 1/34
U.S. Cl. 117—33
8 Claims

ABSTRACT OF THE DISCLOSURE

An antifoulant consisting of granules of a borate glass containing cupric oxide. The granules are applied over a soft and sticky base coating which later hardens and is durable underwater.

---

This invention relates to improve antifoulant coating compositions, to a method of protecting a substrate against fouling, and to the resulting coated article.

Antifoulant coating compositions are applied to substrates which are exposed to sea water as a means of protecting the substrate against growth of marine organisms. Cuprous oxide often is used as a toxicant in such compositions. The copper is released slowly underwater through a leaching process, but the coating must erode continuously and expose fresh copper oxide to be effective. The erosion and leaching rates are difficult to control. Reference can be made to Pitre et al. Patent No. 2,579,610 for an exended discussion of the problems encountered.

An object of my invention is to provide an improved copper oxide antifoulant coating composition and method of protecting a substrate, which composition and method assure uniform erosion and leaching rates, and hence afford effective long-lasting protection.

A more specific object is to provide an improved composition and method which afford the foregoing advantages and in which the copper oxide is embodied in granules of a borate glass applied to an initially soft sticky base coating.

A further object is to provide, as an article of manufacture, a substrate which has the foregoing coating applied hereto.

In the drawing:

The single figure is a perspective view partially broken away of a substrate which has a coating applied in accordance with my invention.

The figure shows a substrate 10 which has a base coating 12. The substrate commonly is metal, although it can be concrete, plastic or wood. The base coating is a material which is soft and sticky as applied, but later hardens and also is durable underwater. If the substrate is metal, the base coating should also furnish protection against corrosion. My preferred base coating material is a coal tar-epoxy resin combination as described in Whittier et al. Patent No. 2,765,288. Alternatives are molten or solution forms of thermoplastic or thermosetting materials, including vinyls, rubber base or alkyd base coating materials, straight epoxy or polyesters. Phenolics also can be used and baked on after the toxicant has been applied. The base coating should have a minimum thickness of about 5 mils. Where protection against corrosion is important, I prefer to apply two coats of the base coating material in order to minimize occurrence of pinholes.

I apply glass granules 13 to the surface of the base coating 12 while the latter is still soft and sticky. These granules contain copper oxide toxicants, and are prepared as hereinafter described. I can brush or dust the granules on the base coating, or blow them on with a conventional spray device 14 as illustrated. The preferred size range of particle size of the granules is from about 20 to 200 mesh. Particles larger than 20 mesh produce an undesirably rough surface. Particles smaller than 200 mesh do not properly penetrate the base coating; hence there is only a small quantity of toxicant at the surface, and this may be worn or rubbed off in too short a time. I prefer to cover the base coating with as heavy a coating of granules as possible. The weight of coating which I can obtain varies with the particle size of the granules. With 20 x 60 mesh granules, I can obtain a coating of about 80 grams per square foot. With smaller particle sizes (e.g. 60 x 140 mesh) the coating may be only about 10 grams per square foot. With 20 x 30 mesh granules, I can obtain coatings which exceed 90 grams per square foot.

The granules 13 are formed of a borate glass and cupric oxide. Their composition is within the following ranges in percent by weight:

| | Percent |
|---|---|
| Oxide of alkali metal or alkaline earth metal | 5 to 30 |
| CuO | 10 to 70 |
| $B_2O_3$ | 15 to 60 |
| $SiO_2$ and $Al_2O_3$ together | 5 to 25 |

My preferred ranges are somewhat more narrow, as follows in percent by weight:

| | Percent |
|---|---|
| Oxide of alkali metal or alkaline earth metal | 10 to 20 |
| CuO | 40 to 65 |
| $B_2O_3$ | 20 to 40 |
| $SiO_2$ and $Al_2O_3$ together | 8 to 20 |

If the copper content is in the lower end of the given range, the content of silica and alumina should be in the high end to diminish the solubility rate.

In preparing the granules, I mix a powdered borate (for example sodium borate), cupric oxide, silica and alumina in proportions to produce the desired composition within the foregoing ranges. I add boric acid or boric oxide as needed to adjust the relative content of $B_2O_3$ and alkali metal oxide or alkaline earth meal oxide. Alternatively I can use a nitrate or carbonate of the metal along with boric acid or boric oxide to furnish the entire content of both. I fuse the mixture in a ceramic or nickel crucible at a temperature within the range of about 900 to 1100 C. in an electric or gas-fired furnace. When I use a ceramic crucible, the fused mixture picks up additional silica and alumina from the crucible, but I make compensating adjustments in the composition of the starting mixture. I prefer a ceramic crucible when using a gas-fired furnace, since nickel crucibles often burn out. It is important to maintain oxidizing conditions in the furnace in order not to reduce the cupric oxide, although a small amount of metallic copper in the glass is not deleterious. Temperatures below 900 C. are too low to fuse the materials, while temperatures above 1100 C. tend to reduce cupric oxide. Use of a nitrate to furnish alkali metal ions has an advantage that the nitrate decomposes to form $NO_2$ which is oxidizing. After fusing the mixture, I cool the resulting glass or quench it in water and pulverize it to the proper particle size.

Following are specific examples of coatings formed in accordance with my invention:

Example I

I prepared granules of a glass of a composition as follows, using the procedure already described for their preparation:

| | Percent by weight |
|---|---|
| $Na_2O$ | 12 |
| CuO | 46 |
| $B_2O_3$ | 31 |
| $SiO_2$ and $Al_2O_3$ | 11 |

The pulverized granules were in a size range of 20 by 60 mesh. First I applied to a steel substrate a base coating of a coal tar-epoxy resin composition 10 mils in thickness. I allowed this coating to cure and then applied a second coating of the same material and thickness. Before the second coating had set, I sprayed over it a coating of the granules just described. The granules were present on the surface of the final coating to the extent of about 80 grams per square foot. I immersed the specimen thus prepared in sea water near Miami, Fla., a region where severe fouling is expected. After 18 months exposure, the specimen showed no fouling, and I estimate its projected life as at least 3 to 5 years.

Example II

I prepared and tested another specimen in the same manner, except that the composition of the granules was as follows:

| | Percent by weight |
|---|---|
| $Na_2O$ | 29 |
| CuO | 27 |
| $B_2O_3$ | 32 |
| $SiO_2$ and $Al_2A_3$ | 12 |

After 15 months exposure, the specimen shows only a small amount of fouling, and I estimate its projected life as about two years.

Example III

I applied coatings to a metal substrate the same as in Example I, except that the particle size of the granules was 60 x 200 mesh and the quantity about 10 grams per square foot. I obtained complete control for 16 months with a projected life of 2 to 2½ years.

From the foregoing description and examples it is seen that my invention affords an easily prepared, effective and long-lasting composition and method for protecting a substrate against growth of marine organisms. The composition of the base coating is not critical, as long as it holds the granules in place and remains durable underwater. The granules are of a form which allows the toxicant copper to leach out at a proper rate for maximum protection.

While I have shown and described only certain preferred compositions and ways of practicing my invention, it is apparent other modifications may arise. Therefore I do not wish to be limited by the disclosure set forth, but only by the scope of the appended claims.

I claim:
1. An antifoulant consisting of granules of a borate glass of the following composition in percent by weight:

| | Percent |
|---|---|
| Oxide of an alkali metal or alkaline earth metal | 5 to 30 |
| CuO | 10 to 70 |
| $B_2O_3$ | 15 to 60 |
| $SiO_2$ and $Al_2O_3$ together | 5 to 25 | the granules being of a particle size in the range of about 20 to 200 mesh.

2. An antifoulant as defined in claim 1 in which the glass is of the following composition in percent by weight

| | Percent |
|---|---|
| Oxide of an alkali metal or alkaline earth metal | 10 to 20 |
| CuO | 40 to 65 |
| $B_2O_3$ | 20 to 40 |
| $SiO_2$ and $Al_2O_3$ together | 8 to 20 |

3. An antifoulant as defined in claim 2 in which said metal oxide is $Na_2O$.

4. A method of protecting a substrate against fouling comprising applying to the substrate a base coating which is durable underwater and initially is soft and sticky, and covering said base coating with granules of the composition and particle size defined in claim 1.

5. A method of protecting a substrate against fouling comprising applying to the substrate a base coating which is durable underwater and initially is soft and sticky, and covering said base coating with granules of the composition and particle size defined in claim 2 in an amount from 10 to 90 grams per square foot.

6. A method as defined in claim 5 in which the base coating is a coal tar-epoxy resin combination.

7. As an article of manufacture, a substrate which has a base coating durable underwater and a covering of granules of the composition and particle size defined in claim 1.

8. As an article of manufacture, a substrate which has a base coating of a coal tar-epoxy resin combination and a covering of granules of the composition and particle size defined in claim 3 in an amount from 10 to 90 grams per square foot.

References Cited

UNITED STATES PATENTS

| 1,138,928 | 5/1915 | Boulton | 117—26 |
|---|---|---|---|
| 2,439,441 | 4/1948 | Amberg et al. | |
| 2,583,545 | 1/1952 | Cameron. | |
| 2,798,816 | 7/1957 | Knappwost. | |
| 3,404,015 | 10/1968 | Dumbaugh | 106—54 |
| 3,408,213 | 10/1968 | Provance et al. | 106—54 |
| 3,420,684 | 1/1969 | Hagedom | 106—54 |

WILLIAM D. MARTIN, Primary Examiner

RAYMOND M. SPEER, Assistant Examiner

U.S. Cl. X.R.

106—54, 15